(12) United States Patent
Bhargava et al.

(10) Patent No.: US 8,136,033 B1
(45) Date of Patent: Mar. 13, 2012

(54) CONVERTING A GRAPHIC OBJECT FROM A FIRST FORMAT TO A SECOND FORMAT WITH THE AID OF A STORED CHECKSUM

(75) Inventors: Gaurav Bhargava, Noida (IN); Anurag Wahi, New Delhi (IN); Ashish Duggal, Delhi (IN); Sanjay Kumar, Ghaziabad (IN)

(73) Assignee: Adobe Systems Incorporated, San Jose, CA (US)

( * ) Notice: Subject to any disclaimer, the term of this patent is extended or adjusted under 35 U.S.C. 154(b) by 695 days.

(21) Appl. No.: 12/250,217

(22) Filed: Oct. 13, 2008

(51) Int. Cl.
*G06F 17/00* (2006.01)
(52) U.S. Cl. .......................... 715/249; 715/229; 715/276
(58) Field of Classification Search .................. None
See application file for complete search history.

(56) References Cited

U.S. PATENT DOCUMENTS

| | | | |
|---|---|---|---|
| 5,999,937 A | 12/1999 | Ellard | |
| 6,219,818 B1 | 4/2001 | Freivald et al. | |
| 6,658,625 B1 | 12/2003 | Allen | |
| 7,954,051 B2 * | 5/2011 | Achilles et al. | 715/234 |
| 2005/0240858 A1 * | 10/2005 | Croft et al. | 715/500 |
| 2005/0262430 A1 * | 11/2005 | Croft | 715/507 |
| 2009/0222719 A1 * | 9/2009 | Croft | 715/229 |
| 2009/0327873 A1 * | 12/2009 | Cairns | 715/249 |

OTHER PUBLICATIONS

Wikipedia, Adler-32, http://en.wikipedia.org/wiki/Adler-32, Aug. 25, 2008, 4 pages.
Wikipedia, SHA Hash Functions, http://en.wikipedia.org/wiki/SHA, Sep. 9, 2008, 12 pages.
Wikipedia, MD4, http://en.wikipedia.org/wiki/MD4, Sep. 9, 2008, 3 pages.
Wikipedia, MD5, http://en.wikipedia.org/wiki/MD5, Sep. 8, 2008, 6 pages.
Wikipedia, Cyclic Redundancy Check, http://en.wikipedia.org/wiki/Cyclic_Redundancy_check, Aug. 14, 2008, 9 pages.
Wikipedia, Hash Function, http://en.wikipedia.org/wiki/Hash_function, Jul. 5, 2008, 5 pages.
Adobe Open Source, FXG 1.0—Functional and Design Specification, http://opensource/.adobe.com/wiki/display/flexsdk/FXG+1.0+Specification, Aug. 17, 2008, 25 pages.

* cited by examiner

*Primary Examiner* — Stephen S. Hong
*Assistant Examiner* — Asher Kells
(74) *Attorney, Agent, or Firm* — Fish & Richardson P.C.

(57) ABSTRACT

Methods, systems, apparatus, and computer program products involve modifying graphic objects. An electronic document can be obtained in a first format. The electronic document can include a graphic object represented using a main dataset and a private dataset. The main dataset can be normalized while stored in an object model in memory. A checksum can be computed for the normalized main dataset of the graphic object. The computed checksum can be compared with a stored checksum located in the electronic document. The electronic document can be converted from the first format to a second format based in part on a result of the comparison.

20 Claims, 6 Drawing Sheets

CONVERTING A GRAPHIC OBJECT FROM A FIRST FORMAT TO A SECOND FORMAT WITH THE AID OF A STORED CHECKSUM

BACKGROUND

The present disclosure relates to modifying graphic objects. A graphic object, which can include vector objects, raster objects, text objects, and others, can be represented using a dataset stored in an electronic document. A computer can interpret the dataset to generate (e.g., using a processor) and display (e.g., using a monitor) a graphical representation of the graphic object. The dataset conforms to a particular data format and/or a particular standard for representing graphic objects. The data format or standard allows the dataset to be interpreted by one or more software applications. For example, a first software application is adapted to interpret graphic objects having a first data format, and a second software application is adapted to interpret graphic objects having a second data format. A graphic object having the first data format can be "exported" to generate a graphic object having the second data format, so that the second software application can render and/or edit the graphic object.

SUMMARY

This specification describes technologies relating to modifying graphic objects.

In general, one aspect of the subject matter described in this specification can be embodied in a method that includes obtaining an electronic document in a first format. The electronic document includes a graphic object represented using a main dataset and a private dataset. The main dataset is normalized while stored in an object model in memory. A checksum is computed for the normalized main dataset of the graphic object. The computed checksum is compared with a stored checksum located in the electronic document. The electronic document is converted from the first format to a second format based in part on a result of the comparison. Other embodiments of this aspect include corresponding systems, apparatus, and computer program products.

These and other embodiments can optionally include one or more of the following features. The computed checksum and the stored checksum can be hash codes. The checksum can be computed by computing multiple hash codes for the normalized main dataset. Each computed hash code can correspond to the graphic object or an attribute of the graphic object. The computed hash codes can be compared with stored hash codes located in the private dataset. A description of the graphic object can be obtained in a proprietary format. The main dataset of the graphic object and the private dataset of the graphic object can be generated based on the obtained description. The private dataset can be generated by computing the stored checksum based on the generated main dataset of the graphic object. The checksum can be computed by computing a checksum of an attribute of the graphic object in the normalized main dataset. The electronic document can be converted by propagating a change in the attribute from the main dataset to the private dataset when the computed checksum and the stored checksum do not match. The main dataset of the graphic object can include code in an open data format, and the private dataset of the graphic object can include code in a proprietary data format. One or more computers can be operable to perform some or all of the operations described above. The one or more computers can include a server further operable to interact with a user interface device through a data communication network. The user interface device can be operable to interact with the server as a client. A personal computer includes the user interface device.

Particular embodiments of the subject matter described in this specification can be implemented to realize one or more of the following advantages. A graphic object can be modified by multiple software applications, for example, software applications that each represent graphic objects differently. A main dataset allows a first software application to read and edit the graphic object, and a private dataset allows a second software application to read and edit the graphic object. Changes to the main dataset can be detected and propagated to the private dataset. The private dataset can be updated to allow the second software application to recognize the changes that have been made to the main dataset. The changes made to the main dataset can be detected and propagated at the attribute level and/or at the object level. One or more individual attributes in the private dataset can be modified to reflect changes to one or more individual attributes in the main dataset, and/or the entire private dataset can be regenerated to reflect changes to the main dataset. Inconsequential and/or non-substantive changes to the main dataset can be removed by normalizing the main dataset before a checksum is computed. Normalizing the main dataset ensures that the main dataset is represented consistently in memory when the stored checksum and the computed checksum are computed. By comparing checksums that are based on a normalized main dataset, meaningful and/or substantive changes to the main dataset can be distinguished from inconsequential and/ or non-substantive changes to the main dataset. In some implementations, inconsequential and/or non-substantive changes include rounding errors. For example, the number 1.0 may be incorrectly represented as 1.0000001 due to rounding errors, and normalization may change the incorrect value 1.0000001 to the correct value 1.0.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
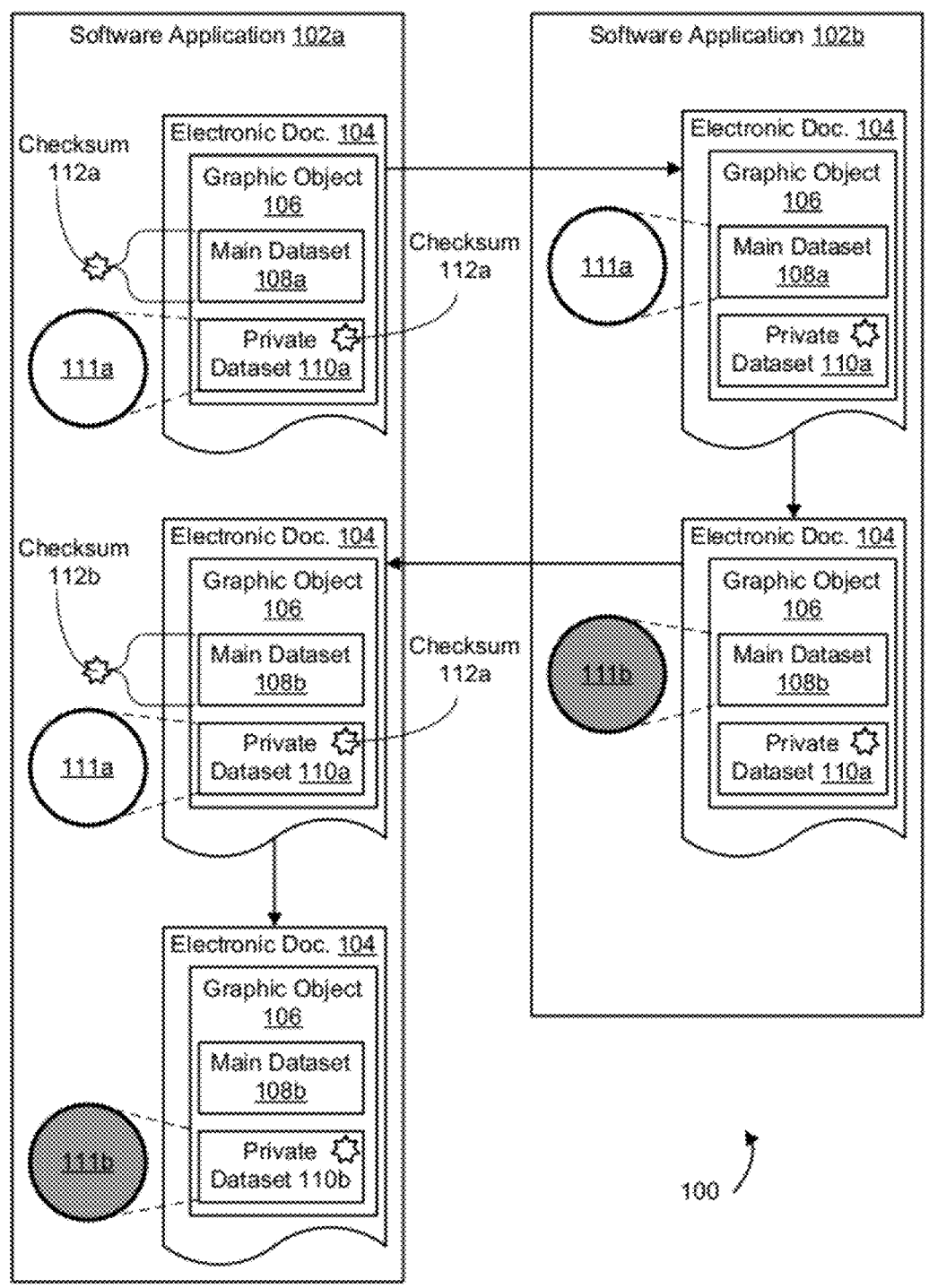
FIG. 1 shows an example of modifying a graphic object.

FIG. 1 is a schematic diagram showing an example process 100 performed by two software applications 102a and 102b. The first software application 102a generates an electronic document 104 that includes a graphic object 106 represented using two different datasets. The first dataset is a main dataset 108a configured for interpretation by the second software application 102b. The second dataset is a private dataset 110a configured for interpretation by the first software application 102a. The first software application 102a can interpret the private dataset 110a to render a graphical representation 111a of the graphic object 106, and the second software application 102b can interpret the main dataset 108a to render the graphical representation 111a of the graphic object 106. The first software application 102a may generate the electronic document 104 to export the graphic object 106 for interpretation by the second software application 102b. For example, the first software application 102a and the second software application 102b may use different standards (e.g., different file formats, code languages, and/or other types of standards) to represent graphic objects, and exporting the graphic object 106 may include generating a representation of the graphic object 106 according to the standards of the second software application 102b. In some implementations, the main dataset 108a represents the graphic object 106 according to the standards of the second software application 102b, and the private dataset 110a represents the graphic object 106 according to the standards of the first software application 102b. In this manner, the first software application 102a and the second software application 102b can both interpret and/or modify the graphic object 106.

The software application 102a computes a checksum 112a based on the main dataset 108a and stores the computed checksum 112a in the private dataset 110a. The software application 102a can subsequently compute an additional checksum 112b based on the main dataset of the graphic object and compare the additional checksum 112b to the checksum 112a stored in the private dataset to identify that changes have been made to the main dataset. Using the stored checksum 112a, the first software application 102a can detect changes made to the main dataset and propagate the changes to the private dataset. That is to say, the private dataset can be updated based on the changes that were made to the main dataset. In some cases, changes to one or more individual attributes of the main dataset are detected and propagated to the individual attributes of the private dataset. In some cases, changes to the main dataset are detected and propagated to the private dataset by generating a new private dataset based on the main dataset.

According to the example process flow shown in FIG. 1, the software application 102a generates the electronic document 104 in a first format. In the first format, the electronic document 104, the main dataset 108a of the graphic object, and the private dataset 110a of the graphic object each specify the attributes and attribute values embodied by the graphical representation 111a. The graphical representation 111a can be an electronic display, a hard copy (e.g., paper), or another type of representation of the graphic object 106. To generate the electronic document 104, the software application 102a can obtain a description of the graphic object 106 in a proprietary data format and generate the main dataset of the graphic object and the private dataset of the graphic object based on the received description.

The application 102a normalizes the main dataset 108a while the main dataset 108a is stored in an object model in memory. Normalization includes ensuring that a component of the main dataset is represented in memory according to a single of multiple possible ways of representing the component in memory. Normalization can include converting a component of the main dataset to a single of multiple possible variants of the component. Normalization may include converting values of the main dataset to one or more data types. Example data types include integer, floating point, double precision floating point, Boolean, and others. Normalization may include converting values of the main dataset to one or more unit types. Example unit types include inches, centimeters, pixels, and others. Normalization may include converting values of the main dataset to one or more color space representations. Example color spaces include RGB, HSV, CMYK, XYZ, and others. Normalization may include converting values of the main dataset to one or more forms of vector graphics notation. Example forms of graphics representation include short form notation, long form notation, and others. Normalization may include converting obtained numeric values to floating point values that have a predetermined precision (e.g., a fixed number of digits). For example, normalization may include converting all floating point values to four-digit precision floating point values. For instance, the floating point value "1.2" may be converted to the floating point value "1.200," and the floating point value "1.200000" may be converted to the floating point value "1.200". Normalization may include converting text elements of a graphic object to a standard form. Attributes can be specified at different levels in a text element. Example attributes of a text element include font type (e.g., Arial, Courier, and others), font size (e.g., 12 point, 14 point, and others), and other types of attributes. Example levels in a text element include the paragraph level, span level, and others. An example text element follows.

<TextElement>
  <p font="Arial">
    <span fontSize="12">
      first
    </span>
    <span fontSize="14">
      second
    </span>
  </p>
</TextElement>

In the example above, the font type is specified at the paragraph level, and the font size is specified at the span level. Normalization may include converting a text element that specifies an attribute (e.g., font type and/or font size) at a first level (e.g., the paragraph level) to a corresponding text element that specifies the attribute at a different level (e.g., the span level). Normalization may include combining multiple spans and/or paragraphs into a single span and/or paragraph. Normalization may include parsing a single span and/or paragraph into multiple spans and/or paragraphs.

In an example, the main dataset is expressed using FXG coding language, which is an extensible markup language (XML)-compliant standard for representing graphic objects. In the FXG coding language, path segments for graphics can be defined in two different forms. In a first form, path segments can be defined as a tree of tags, such as LineSegment and CubicBezierSegment. An example path segment in the first form is <Path>
  <MoveSegment x="100" y="200"/>
  <LineSegment x="100" y="300"/>
  <LineSegment x="600" y="300"/>
  <LineSegment x="600" y="200"/>
  <LineSegment x="100" y="200"/>
</Path>.

In a second form, path segments can be defined as a string in an attribute value, where the string is encoded to define path segments. An example path segment in the second form is
<Path data="M 100,200 L 100,300 L 600,300 L 600,200 L 100,200"/>,
where "M" represents "MoveTo/MoveSegment" and "L" represents "LineTo/LineSegment." Normalization may convert a path segment expressed in one form to a path segment expressed in the other form.

According to the example shown, the software application 102a computes the checksum 112a based on the normalized main dataset. The checksum 112a is stored in the private dataset 110a. The second software application 102b obtains the electronic document 104 in the first format. The software application 102b modifies the main dataset 108a to generate the modified main dataset 108b. Alternatively, the software application 102b may simply replace the main dataset 108a with a different main dataset 108b. The software application 102b can interpret the updated main dataset 108b to generate the updated graphical representation 111b. The updated graphical representation 111b has a different fill color than the graphical representation 111a. In the example, the main dataset 108a may include a fill attribute with the attribute value "white," and the main dataset 108b may include the fill attribute with the attribute value "grey."

The first software application 102a obtains the electronic document 104. The first software application 102a normalizes the main dataset 108b in an object model in memory. The normalization of the main dataset 108b ensures that components of the main dataset 108b are represented in memory in the same manner (e.g., using the same units, machine precision, path form, and others) that the components of the main dataset 108a were represented in memory when the stored checksum 112a was computed. Thus, inconsequential changes to the main dataset may be removed, while meaningful changes to the main dataset may be preserved. In such a case, the checksums 112b and 112a are only different when substantive changes have been made to the main dataset. Meaningful changes to the main dataset may affect the appearance of a graphical representation generated based on the main dataset. Examples of a meaningful change include changing an object size, changing an object path, changing an object position, changing an object orientation, changing an object shape, modifying an attribute, adding or removing an attribute, changing an attribute value (e.g., fill color, fill texture, stroke color, line thickness, font type, font size, font placement, transparency), and/or others. On the contrary, an example of a change to the main dataset that may not affect the appearance of a graphical representation includes changing a length value of 1.00 inches to a substantively equivalent value, such as 1.0000 inches, 1.0000001 inches, or 2.54 centimeters. Another example of a change to the main dataset that may not affect the appearance of a graphical representation includes changes due to rounding errors. For instance, a value of "1.0" may be incorrectly written as "1.0000001" due to rounding errors, and normalization can convert "1.0000001" to "1.0." Another example of a change to the main dataset that may not affect the appearance of a graphical representation includes changing a color expressed in RGB coordinates to the identical color expressed in HSV coordinates. Another example of a change to the main dataset that may not affect the appearance of a graphical representation includes changing a path expressed in short form to the identical path expressed in the long form, described above.

Continuing the shown example, the software application 102a compares the computed checksum 112b with the stored checksum 112a. In the example, since the fill color of the graphical representation has changed, the computed checksum 112b and the stored checksum 112a are not equal. Thus, the first software application 102a identifies that the main dataset has been modified since the checksum 112a was computed. The first software application 102a converts the electronic document 104 to an updated format. In converting the electronic document to the updated format, the software application 102a modifies the private dataset 110a to generate the modified private dataset 110b. Alternatively, the first software application 102a may convert the electronic document 104 to the updated format by simply replacing the private dataset 110a with a different private dataset 110b. In some cases, converting the electronic document 104 to an updated format includes, when the computed checksum 112b and the stored checksum 112a do not match, propagating a change in an attribute from the main dataset 108b to the private dataset. The software application 102b can interpret the updated private dataset 110b to generate the updated graphical representation 111b.

The software applications 102a and 102b can include any type of image viewing and/or image editing software. The software applications 102a and 102b can include visual effects software (e.g., Adobe® After Effects® software, available from Adobe Systems Incorporated of San Jose, Calif.), graphics software (e.g., Adobe® Illustrator® software, available from Adobe Systems Incorporated of San Jose, Calif.), image editing software (e.g., Adobe® Photoshop® software, available from Adobe Systems Incorporated of San Jose, Calif.), and/or video editing software (e.g., Adobe® Premiere® software, available from Adobe Systems incorporated of San Jose, Calif.). Thus, the image processing application 212 can operate on digital images and/or graphic objects from many different sources. In some cases, all or some of the operations described with respect to the software application 102b can be performed by the first software application 102a. Thus, in some cases, the shown process may be performed using a single software application.

The electronic document 104 may be embodied as a file stored in a memory. However, the electronic document 104 does not necessarily correspond to a file. A document may be stored in a portion of a file that holds other documents, in a single file dedicated to the document in question, or in multiple coordinated files. The electronic document may store multiple graphic objects in addition to other types of data. Examples of other types of data that may be stored in an electronic document 104 include various types of text objects, including headers, metadata, hyperlinks, comments, and others. The electronic document 104 may include an image or a graphic object in any type of file format and/or electronic document format. Example image file formats include Bitmaps (BMP, developed by Microsoft Corporation of Redmond, Wash.), Graphics Interchange Format (GIF, developed by CompuServe of Columbus, Ohio), Tagged Image File Format (TIFF, developed by Adobe Systems Incorporated of San Jose, Calif.), Joint Photographic Experts Group (JPEG, developed by Joint Photographic Experts Group), Extended Dynamic Range Image File Format (OpenEXR, developed by industrial Light and Magic of San Francisco, Calif.), and others. Example graphic object file formats include Scalable Vector Graphics format (SVG, developed by the World Wide Web Consortium), FXG (developed by Adobe Systems Incorporated of San Jose, Calif.), Adobe Illustrator format (AI, developed by Adobe Systems Incorporated of San Jose, Calif.), and others.

The graphic object 106 can be any type of graphic object and may include text objects, vector objects, raster objects, and/or others. Example graphic objects include geometric shapes (e.g., square, cube, cylinder, hexagon, triangle, sphere, and others), lines, surfaces, raster images, lines of text, and combinations thereof. The graphics object can include object data and attributes. Each attribute can specify an element of the graphic object and include an attribute value that specifies properties of the element. Example attributes include stroke, fill, line, and others. Example attribute values include line size, line length, fill color, position. Sizes can be expressed in any type of units (e.g., inches, centimeters, pixels, or another unit). Colors can be represented in any type Of color space.

Example color spaces include sRGB, CMYK, Adobe RGB, CIE LAB, and others. The graphic object can include an array of pixels, such as a Cartesian or rectangular array of pixels. Each pixel can include one or more values that define a color (e.g., using any of the color space representations mentioned above and/or others) or grayscale value of the pixel. A graphic object may have more than two dimensions. For example, a graphic object may include a three-dimensional array of pixels.

The main datasets 108a, 108b and/or the private datasets 110a, 110b can be any type of data format. The main datasets 108a, 108b and/or the private datasets 110a, 110b of the graphic object may include code in an open data format, for example, SVG, XML, and/or XML-compliant languages, such as FXG. The main datasets 108a, 108b and/or the private datasets 110a, 110b of the graphic object may include code in a proprietary data format, such as Adobe® Illustrator®. In some implementations, the main dataset of the graphic object includes code in an open data format and the private dataset of the graphic object includes code in a proprietary data format.

Both of the checksums 112a and 112b are computed based on the same technique, so that a comparison between the checksums can be used to detect differences between main dataset 108a and the main dataset 180b. The checksums 112a and 112b can be hash values, cyclic redundancy checks, and/or other types of checksums. A hash value is typically generated by applying a hashing algorithm to input data. In the example shown, the input data is the main dataset. In other cases, the input data may be the private dataset, an attribute of the main dataset or the private dataset, and/or other data. The hash value can be smaller (e.g., represented by fewer characters, digits, bits, etc.) and/or consume less memory than the input dataset. A hashing algorithm may generate a substantially unique value for each of a broad range of different input datasets. In some cases, even a small change in the input dataset (e.g., changing one or two digits or characters) changes the hash value generated by the hashing algorithm. Thus, the hash value may efficiently represent a state of a dataset, such as a dataset of a graphic object, and the hash value may be used to efficiently identify that the suite of a dataset has changed. Example hashing algorithms include MD4, MD5, variants of the Secure Hash Algorithm (SHA) (i.e., SHA-1, SHA-256, SHA-512, etc.), and others. A cyclic redundancy check may be generated by applying a function to an input dataset. In some cases, a cyclic redundancy check is computed by applying a divisor to the input dataset. The result of applying the divisor can include a quotient and a remainder, and the remainder may be stored as the cyclic redundancy check. Example functions for computing a cyclic redundancy check include CRC-16, CRC-32, CRC-64, Adler-32, and others.

Other embodiments of the process 100 may include one or more variations. The process may be carried out by hardware, firmware, one or more software applications, and/or a combination of these. The checksums may be computed by a separate software application. For example, the first software application 102a and/or the second software application 102b may invoke a third software application to normalize the main dataset, to compute the checksums 112a and 112b, to compare the checksums 112a and 112b, and/or for other operations. The electronic document 104 may be communicated directly or indirectly between the software applications 102a and 102b. The electronic document 104 may be communicated over a network, stored and/or retrieved from memory or a storage device, and/or transmitted in another way. The checksums 112a and 112b are calculated on the main datasets 108a and 108b, respectively, to identify changes in the main dataset. However, the checksums 112a and 112b may be calculated based on the private datasets 110a and 110b, respectively, to identify changes in the private dataset. In such a case, changes to the private dataset can be propagated to the main dataset. Alternatively or additionally, one or more checksums may be computed based on components or attributes of a dataset.

Figure 2A:
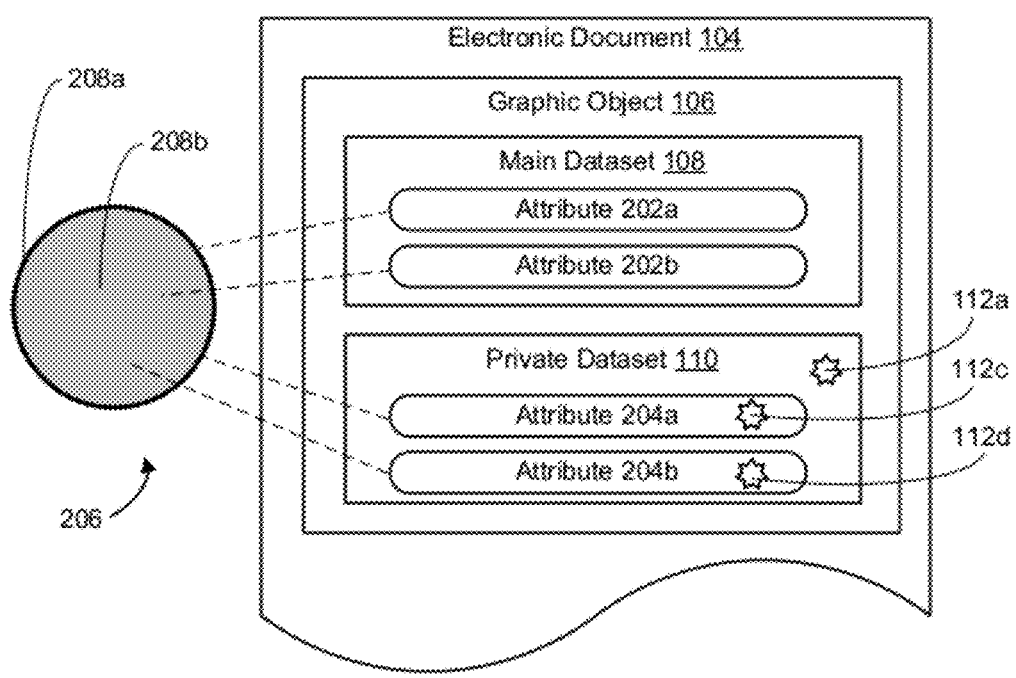
FIG. 2A shows an example graphic object in an electronic document.

FIG. 2A schematically shows an example graphic object 106 in an electronic document 104 of FIG. 1. The example graphic object 106 includes a main dataset 108 and a private dataset 110. The main dataset 108 includes a first attribute 202a and a second attribute 202b. The private dataset 110 includes a first attribute 204a and a second attribute 204b. A graphical representation 206 of the graphic object 106 can be generated based on each of the main dataset 108 and the private dataset 110. For example, a first software application (e.g., the software application 102a of FIG. 1) may generate the graphical representation 206 based on the private dataset 110, and a second software application (e.g., the software application 102b of FIG. 1) may generate the graphical representation 206 based on the main dataset 108.

Each attribute in the main dataset 108 and the private dataset 110 may correspond to an element of the graphical representation 206. For instance, in the example shown, the graphic representation includes a stroke element 208a and a fill element 208b. The attribute 202a and the attribute 204a each specify the stroke element 208a and properties (e.g., thickness, color, and/or others) of the stroke element 208a. The attribute 202a specifies the stroke element 208a and its properties in a manner consistent with the data format of the main dataset 108. For example, if the main dataset 108 is written in FXG, the attribute 202a represents the stroke element 208a and/or properties of the stroke element 208a in an XML-compliant form. The attribute 204a specifies the stroke element 208a and its properties in a manner consistent with the data format of the private dataset 110. For example, if the private dataset 110 is written in a proprietary format, the attribute 204a represents the stroke element 208a and/or properties of the stroke element 208a in a form that is compliant with the proprietary format. The attribute 202b and the attribute 204b each specify the fill element 2084 and properties (e.g., color, texture, transparency, and/or others) of the fill element 208b. The attribute 202b specifies the fill element 208b and its properties in a manner consistent with the data format of the main dataset 108. The attribute 202b specifics the fill element 208b and its properties in a manner consistent with the data format of the main dataset 108.

A checksum may be used to detect changes in the portion of a dataset upon which the checksum is based. In some implementations, if a checksum is computed based on a whole dataset, the checksum may be used to detect a change to any part of the whole dataset. In some implementations, if a checksum is computed based on an component of a dataset (e.g., an attribute, an attribute Value, or another type of component), the checksum can be used to detect a change to the component. In the example shown, the private dataset 110 includes three checksums 112a, 112c, and 112d. The checksum 112a is computed based on the main dataset 108, including both attributes 202a and 202b. Thus, the checksum 112a can be used to detect a change to the dataset 108, including both attributes 202a and 202b. Changes in the dataset 108 may be propagated to the dataset 110. As shown, the checksum 112a is stored in the private dataset 110, but the checksum 112a may be stored elsewhere in the electronic document 104. The checksum 112c is computed based on the attribute 202a. Thus, the checksum 112c can be used to detect a change to the attribute 202*a*. Changes in the attribute 202*a* may be propagated to the attribute 204*a*. As shown, the checksum 112*c* is stored in the attribute 204*a*, but the checksum 112*c* may be stored elsewhere in the electronic document 104. The checksum 112*d* is computed based on the attribute 202*b*. Thus, the checksum 112*d* can be used to detect a change to the attribute 202*b*. Changes in the attribute 202*b* may be propagated to the attribute 204*b*. As shown, the checksum 112*d* is stored in the attribute 204*b*, but the checksum 112*d* may be stored elsewhere in the electronic document 104.

Figure 2B:
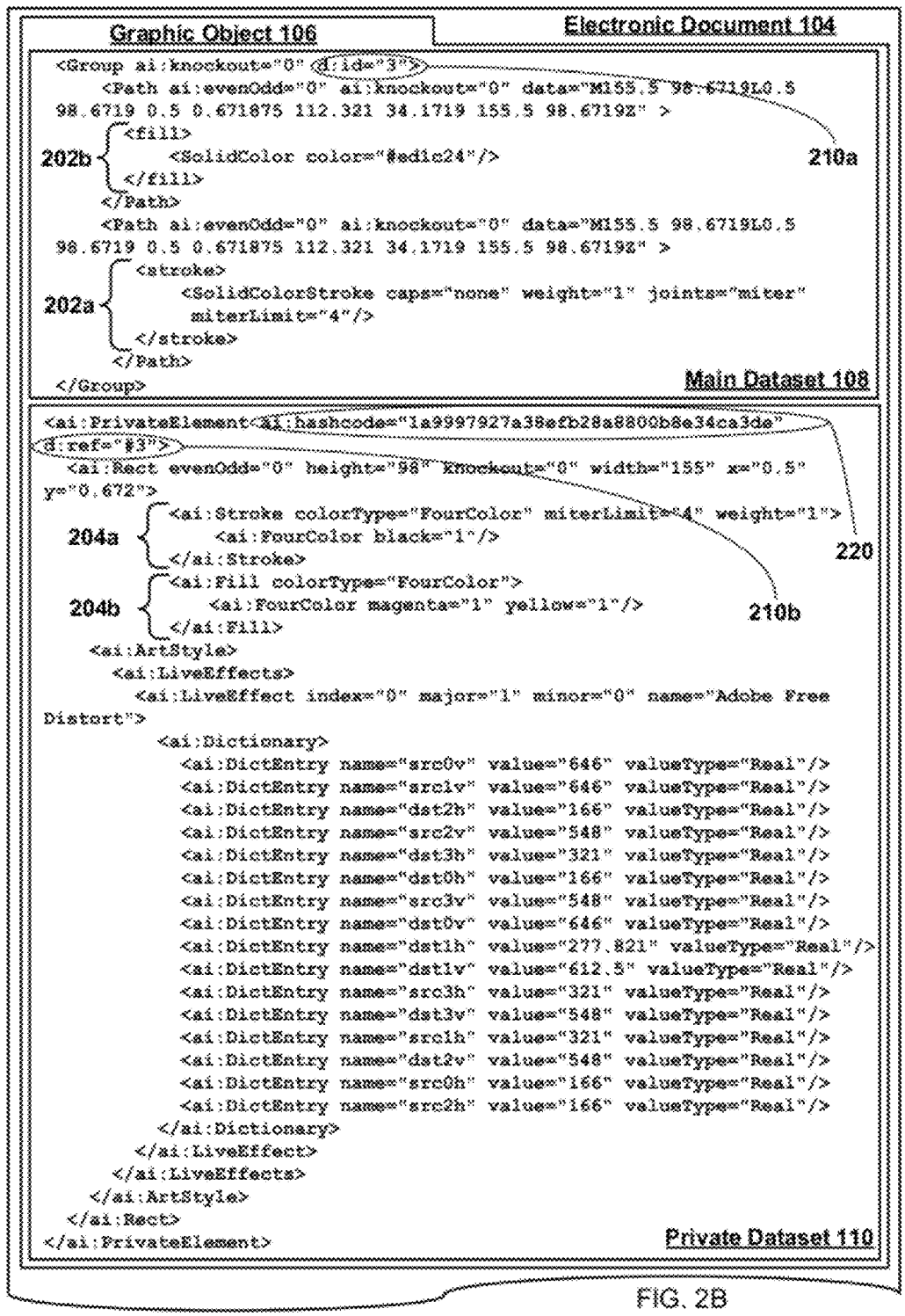
FIG. 2B shows an example graphic object in an electronic document.

FIG. 2B shows an example graphic object 106 in an electronic document 104. The example graphic object 106 includes a main dataset 108 and a private dataset 110. The main dataset 108 includes a first attribute 202*a* and a second attribute 202*b*. The private dataset 110 includes a first attribute 204*a* and a second attribute 204*b*. The example main dataset 108 represents the graphic object 106 using FXG, which is compliant with XML, an open, non-proprietary data format. The example private dataset 110 represents the graphic object 106 using Adobe® Illustrator® format, which is a proprietary format.

The main dataset 108 includes a rectangular path having a fill attribute 202*b*, and the main dataset 108 includes a rectangular path having a stroke attribute 202*a*. The private dataset 108 includes a rectangular object having a fill attribute 204*b* and a stroke attribute 204*a*. The main dataset 108 and the private data set 110 can each be interpreted by appropriate software to render a substantially equivalent graphical representation of the graphic object 106. The main dataset 108 can be interpreted, for example, by an XML reader. The private dataset 110 can be interpreted, for example, by Adobe® Illustrator®.

The main dataset 108 and the private dataset 110 can be associated by a common identifier. In the example shown, the main dataset 108 includes an identifier 210*a* that corresponds to an identifier 210*b* in the private dataset 110. For example, when Adobe® Illustrator® reads the private dataset 110, it may identify an associated main dataset 108 based on an identifier included in both datasets. The code 'd:id="3"' indicates that the main dataset 108 is associated with another dataset having the reference number "3". Similarly, the code 'd:ref="#3"' indicates that the private dataset 110 is associated with another dataset having the identifier "3". In the example shown, identifiers 210*a* and 210*b* are stored in the first lines of the main dataset 108 and the private dataset 110, respectively. However, the identifiers may be stored elsewhere in the respective datasets. In some cases, an identifier can be stored as a child element in the private dataset 110. For example, a dataset could include a child element "<identifier d:id="3">" at any of various places in the dataset.

The private dataset 110 includes a hash code 220. In the example shown, the hash code 220 is stored in the first line of the private dataset 110. However, the hash code 220 may be stored elsewhere in the electronic document 104. The hash code 220 is computed based on the main dataset 108 and can be used to detect changes in the main dataset 108. In some implementations, the attribute 204*a* and/or the attribute 204*b* may additionally or alternatively include a checksum. In an example implementation, the first line of the attribute 204*b* reads <ai:Fill colorType="FourColor" ai:hashCode="ExampleHashCode0123456789ABCDEF">. A checksum for an attribute may be included elsewhere in the attribute, elsewhere in the dataset, or elsewhere in the electronic document.

Figure 3A:
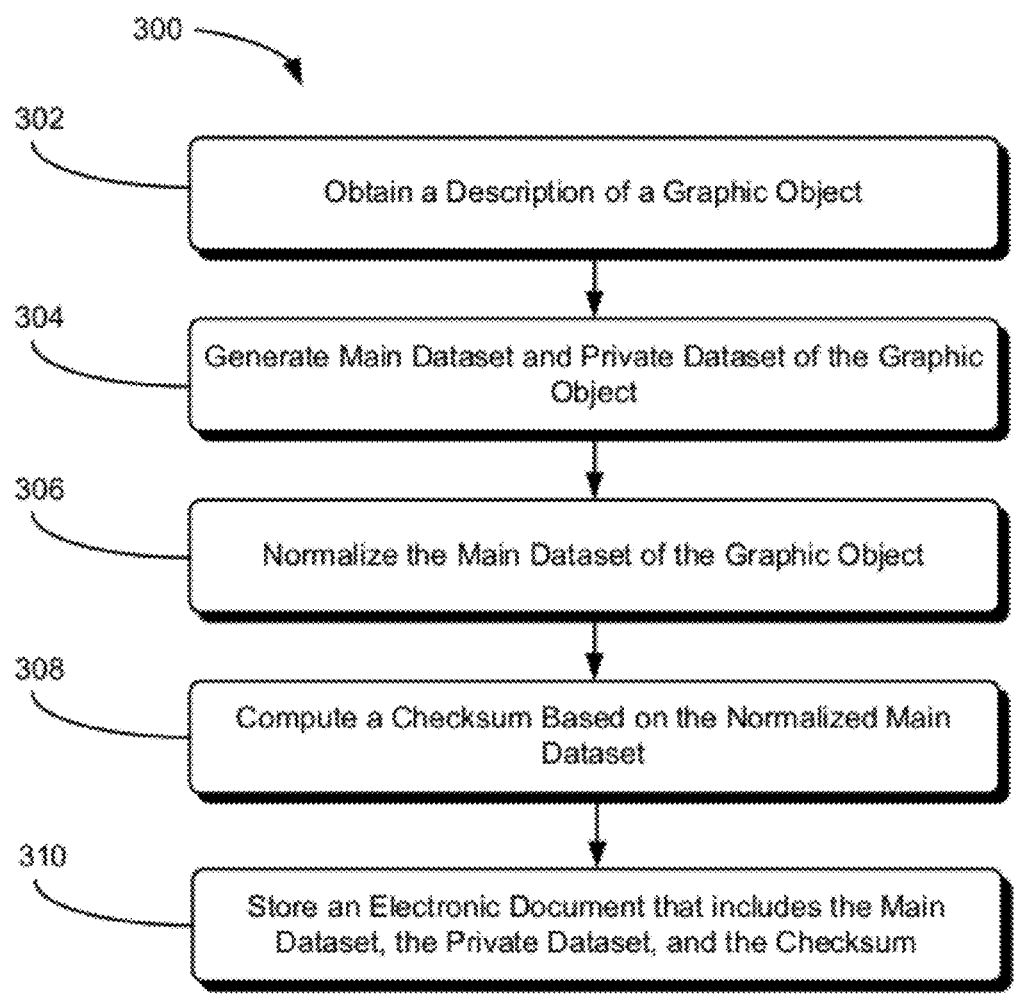
FIG. 3A is a flow chart showing an example process for generating an electronic document that includes a graphic object.

FIG. 3A is a flow chart showing an example process 300 for generating an electronic document that includes a graphic object. A description of a graphic object is obtained 302. The description may be received through a user interface, over a communication interface (e.g., a network), read from memory or a storage device, generated by a processor that executes software instructions, or obtained in another manner. The description may be obtained in a proprietary data format, in an open (i.e., non-proprietary) data format, or another type of data format. The graphic object can include text, raster objects, vector objects, and/or others. A main dataset and a private dataset of the graphic object are generated 304 based on the obtained description. Both the main dataset and the private dataset may specify the same graphical representation using a different data format. The main dataset or the private dataset may include the obtained description in the same data format, as it was obtained 302. The main dataset or the private dataset may include the description in a converted (e.g., exported) data format. In some implementations, the description of the graphic object is obtained in a proprietary data format, the private dataset includes the obtained description of the graphic object in the proprietary data format, and the main dataset includes an exported version of the graphic object in a non-proprietary data format.

The main dataset of the graphic object is normalized 306. The dataset may be normalized in an object model in memory. Normalization can include converting a component of the main dataset to a single of multiple possible variants of the component. Normalization may include converting data types, units, color space coordinates, fonts, notation, and/or others. A checksum is computed 308 based on the normalized main dataset. The checksum can be a hash code, a cyclic redundancy check, or another type of checksum. The checksum can allow detection of changes to the main dataset. The checksum may be computed based on one or more attributes and/or other components of the normalized main dataset. The checksum may be computed based on the entire normalized main dataset some cases, multiple checksums are computed, and each checksum is based on an attribute or on the whole main dataset. The main dataset, the private dataset, and the checksum are stored 310 in an electronic document. The checksum may be stored in the private dataset or elsewhere in the electronic document.

Figure 3B:
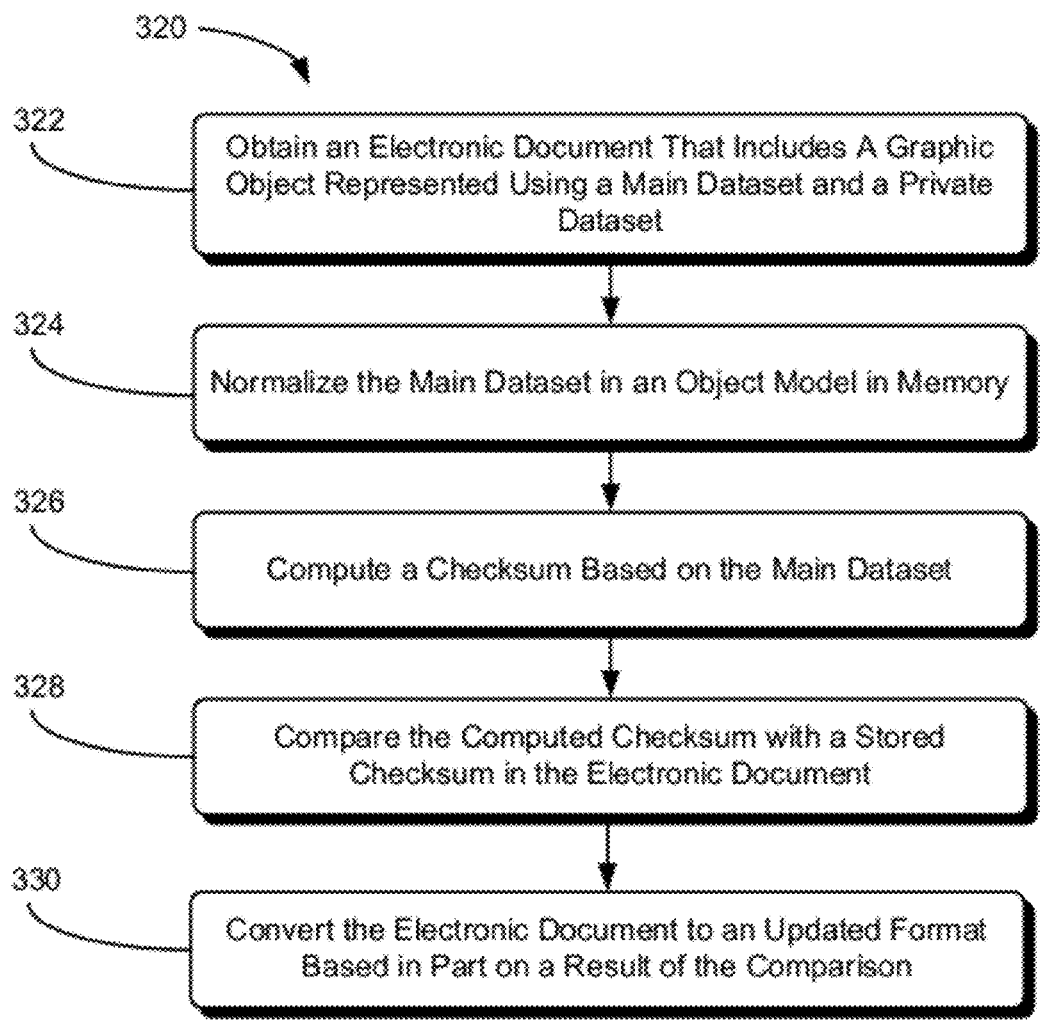
FIG. 3B is a flow chart showing an example process for detecting changes to a dataset of a graphic object.

FIG. 3B is a flow chart showing an example process 320 for detecting changes to a dataset of a graphic object. An electronic document is obtained 322. For example, the electronic document may be obtained by reading data from memory or from a storage device, by receiving data over a communication interface and/or from a user interface, by generating the electronic document using software and/or hardware, and/or by another technique. The electronic document includes a graphic object represented using a main dataset and a private dataset. The electronic document may be obtained in a first format. The first format may specify first attribute values for each of multiple attributes of the graphic object. The electronic document includes a stored checksum that was previously computed based on the main dataset. In some cases, the stored checksum was computed when the main dataset specified different attribute values for one or more of the attributes, and thus, the stored checksum was computed when the electronic document was in a different format.

The main dataset of the graphic object is normalized 324 in an object model in memory. The main dataset is normalized in the same manner that the main dataset was normalized when the stored checksum was computed. A checksum is computed 326 based on the normalized main dataset. Computing the checksum may include computing a hash value based on an attribute of the normalized main dataset. The computed checksum is compared 328 with the stored checksum located in the electronic document. In some cases, comparing the stored checksum to the computed checksum identifies that an attribute value and/or another value in the main dataset has been changed. In some cases, comparing the stored checksum to the computed checksum identifies that an attribute and/or another component in the main dataset has been added or deleted. The electronic document is converted 330 to an updated format based in part on a result of the comparison 328. In some implementations, when the computed checksum and the stored checksum do not match, a change may be propagated from the main dataset to the private dataset. For example, a change to an attribute value, an added attribute, a deleted attribute, a change to a header or metadata, and/or other changes may be propagated from the main dataset to the private dataset.

Figure 4:
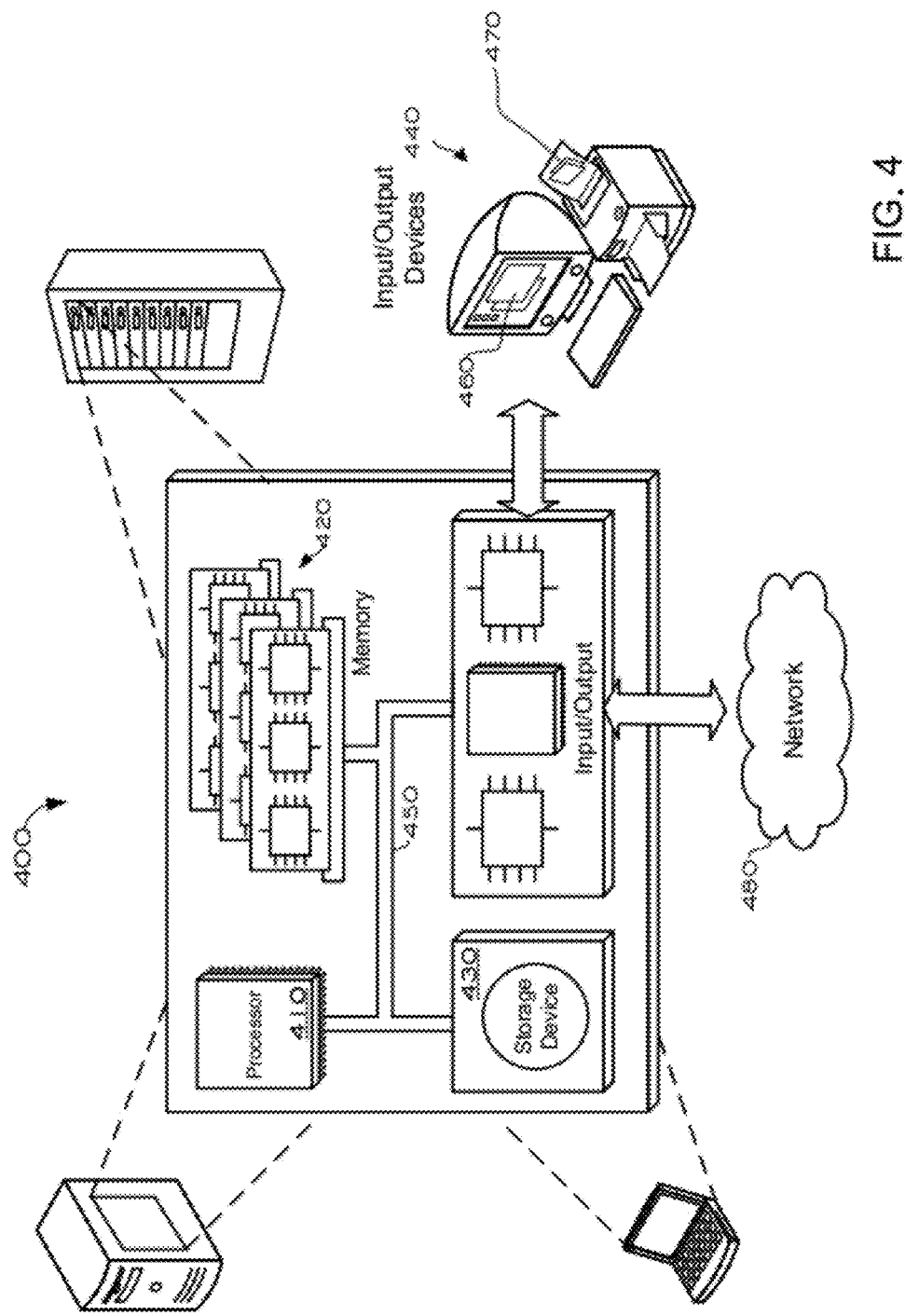
FIG. 4 is a diagram of an example computer system for modifying a graphic object.

FIG. 4 is a diagram of an example computer system 400 for modifying one or more datasets of a graphic object. In some implementations, the modification of a graphic object can be implemented in hardware as part of the system 400. The system 400 can include a processor 410, memory 420, a storage device 430, and one or more input/output devices 440. Each of the components 410, 420, 430, and 440 are interconnected using a system bus 450. The processor 410 is capable of processing instructions for execution within the system 400. In one implementation, the processor 410 is a single-threaded processor. In another implementation, the processor 410 is a multi threaded processor. The processor 410 is capable of processing instructions stored in the memory 420 or on the storage device 430 to display graphical information for a user interface on the input/output devices 440. For example, the processor 410 may process one or more datasets of a graphic object to display a graphical representation 460 of the graphic object on a monitor, or the processor 410 may process one or more datasets of a graphic object to provide a printed graphical representation 470 of the graphic object on a printer.

The memory 420 is a computer readable medium such as volatile or non volatile memory that stores information within the system 400. The memory 420 can store data structures representing electronic documents, graphic objects, and datasets of graphic objects, for example. The storage device 430 is capable of providing persistent storage for the system 400. The storage device 430 may be a floppy disk device, a hard disk device, an optical disk device, or a tape device, or other suitable persistent storage means. The input/output device 440 provides input/output operations for the system 400. In some implementations, the input/output device 440 includes a keyboard and/or pointing device. In other implementations, the input/output devices 440 includes a display unit for displaying graphical user interfaces. The system 400 can be connected to a network 480, such as the Internet, an intranet, or an ad hoc network. Information can be accessed and read from the network 480, such as electronic documents and their contents.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A computer-implemented method comprising:
   obtaining an electronic document in a first format, the electronic document comprising a graphic object represented using a main dataset and a private dataset;
   normalizing the main dataset of the graphic object of the electronic document stored in an object model in memory;
   computing a checksum for the normalized main dataset of the graphic object;
   comparing the computed checksum with a stored checksum located in the private dataset of the electronic document; and
   converting the electronic document from the first format to a second format based in part on a result of the comparing, wherein the converting comprises, when the computed checksum and the stored checksum do not match, propagating a change from the main dataset to the private dataset.

2. The method of claim 1, wherein the computed checksum and the stored checksum comprise hash codes, the computing comprises computing multiple hash codes for the normalized main dataset, each computed hash code corresponding to one of the graphic object or an attribute of the graphic object, and the comparing comprises comparing the computed hash codes with stored hash codes located in the private dataset.

3. The method of claim 1, further comprising:
   obtaining a description of the graphic object in a proprietary data format; and
   generating the main dataset of the graphic object and the private dataset of the graphic object based on the obtained description.

4. The method of claim 3, wherein generating the private dataset of the graphic object comprises computing the stored checksum based on the generated main dataset of the graphic object.

5. The method of claim 1, wherein the computing comprises computing a checksum of an attribute of the graphic object in the normalized main dataset, and the converting comprises, when the computed checksum and the stored checksum do not match, propagating a change in the attribute from the main dataset to the private dataset.

6. The method of claim 1, wherein the main dataset of the graphic object comprises code in an open data format and the private dataset of the graphic object comprises code in a proprietary data format.

7. A computer program product, encoded on a computer-readable medium, operable to cause data processing apparatus to perform operations comprising:
   obtaining an electronic document in a first format, the electronic document comprising a graphic object represented using a main dataset and a private dataset;
   normalizing the main dataset of the graphic object of the electronic document stored in an object model in memory;
   computing a checksum for the normalized main dataset of the graphic object;
   comparing the computed checksum with a stored checksum located in the private dataset of the electronic document; and
   converting the electronic document from the first format to a second format based in part on a result of the comparing, wherein the converting comprises, when the computed checksum and the stored checksum do not match, propagating a change from the main dataset to the private dataset.

8. The computer program product of claim 7, wherein the computed checksum and the stored checksum comprise hash codes, the computing comprises computing multiple hash codes for the normalized main dataset, each computed hash code corresponding to one of the graphic object or an attribute of the graphic object, and the comparing comprises comparing the computed hash codes with stored hash codes located in the private dataset.

9. The computer program product of claim 7, further comprising:
  obtaining a description of the graphic object in a proprietary format; and
  generating the main dataset of the graphic object and the private dataset of the graphic object based on the obtained description.

10. The computer program product of claim 9, wherein generating the private dataset of the graphic object comprises computing the stored checksum based on the generated main dataset of the graphic object.

11. The computer program product of claim 7, wherein the computing comprises computing a checksum of an attribute of the graphic object in the normalized main dataset, and the converting comprises, when the computed checksum and the stored checksum do not match, propagating a change in the attribute from the main dataset to the private dataset.

12. The computer program product of claim 7, wherein the main dataset of the graphic object comprises code in an open data format and the private dataset of the graphic object comprises code in a proprietary data format.

13. A system comprising:
  a user interface device; and
  one or more computers operable to interact with the user interface device and to:
    obtain an electronic document in a first format, the electronic document comprising a graphic object represented using a main dataset and a private dataset;
    normalize the main dataset of the graphic object of the electronic document stored in an object model in memory;
    compute a checksum for the normalized main dataset of the graphic object;
    compare the computed checksum with a stored checksum located in the private dataset of the electronic document; and
    convert the electronic document from the first format to a second format based in part on a result of the comparing, wherein the converting comprises, when the computed checksum and the stored checksum do not match, propagating a change from the main dataset to the private dataset.

14. The system of claim 13, wherein the computed checksum and the stored checksum comprise hash codes, the one or more computers are operable to compute the checksum by computing multiple hash codes for the normalized main dataset, each computed hash code corresponding to one of the graphic object or an attribute of the graphic object, and the one or more computers are operable to compare the computed checksum with the stored checksum by comparing the computed hash codes with stored hash codes located in the private dataset.

15. The system of claim 13, wherein the one or more computers are further operable to:
  obtain a description of the graphic object in a proprietary format; and
  generate the main dataset of the graphic object and the private dataset of the graphic object based on the obtained description.

16. The system of claim 15, wherein the one or more computers are operable to generate the private dataset by computing the stored checksum based on the generated main dataset of the graphic object.

17. The system of claim 13, wherein the one or more computers are operable to compute the checksum by computing a checksum of an attribute of the graphic object in the normalized main dataset, and the one or more computers are operable to convert the electronic document by propagating a change in the attribute from the main dataset to the private dataset when the computed checksum and the stored checksum do not match.

18. The system of claim 13, wherein the main dataset of the graphic object comprises code in an open data format and the private dataset of the graphic object comprises code in a proprietary data format.

19. The system of claim 13, wherein the one or more computers comprise a server operable to interact with the user interface device through a data communication network, and the user interface device is operable to interact with the server as a client.

20. The system of claim 13, wherein the one or more computers comprises one personal computer, and the personal computer comprises the user interface device.

* * * * *